United States Patent
Villemaud

[15] 3,675,754
[45] July 11, 1972

[54] CONVEYORS INTENDED TO CARRY DIRECTLY OBJECTS OR OBJECTS MOUNTED ON SUPPORTS

[72] Inventor: Jean Etienne Villemaud, Les Sagnes, 87, Saint-Priest Taurion, France

[22] Filed: Oct. 30, 1970

[21] Appl. No.: 84,990

[30] Foreign Application Priority Data

Oct. 31, 1969 France........................6937605
Nov. 3, 1969 France........................6938122
June 5, 1970 France........................7020836

[52] U.S. Cl...........................................198/20
[51] Int. Cl.........................................B65g 47/00
[58] Field of Search.....................198/20, 177, 38

[56] References Cited

UNITED STATES PATENTS 2,949,996   8/1960   Tonelli..........................198/177 R
736,274   8/1903   Lingo............................198/177 R Primary Examiner—Richard E. Aegerter
Attorney—Waters, Roditi, Schwartz & Nissen

[57] ABSTRACT

This conveyor intended for the transport of objects possibly mounted on supports comprises a succession of standard rectilinear transport elements, each controlled by a reduction drive motor and each including at least two pulleys; a transmission element such as a chain or a belt, the said transmission element being provided with gripping members designed to catch hold of the objects to be transported or their supports, the said transmission element being passed round the two said pulleys; guide rails for the transmission element; at least one supporting surface intended to bear the weight of the object and its support; and means of transfer able to unfasten the objects or their supports from a standard rectilinear transport element and to engage them with another standard rectilinear element of the conveyor.

9 Claims, 4 Drawing Figures

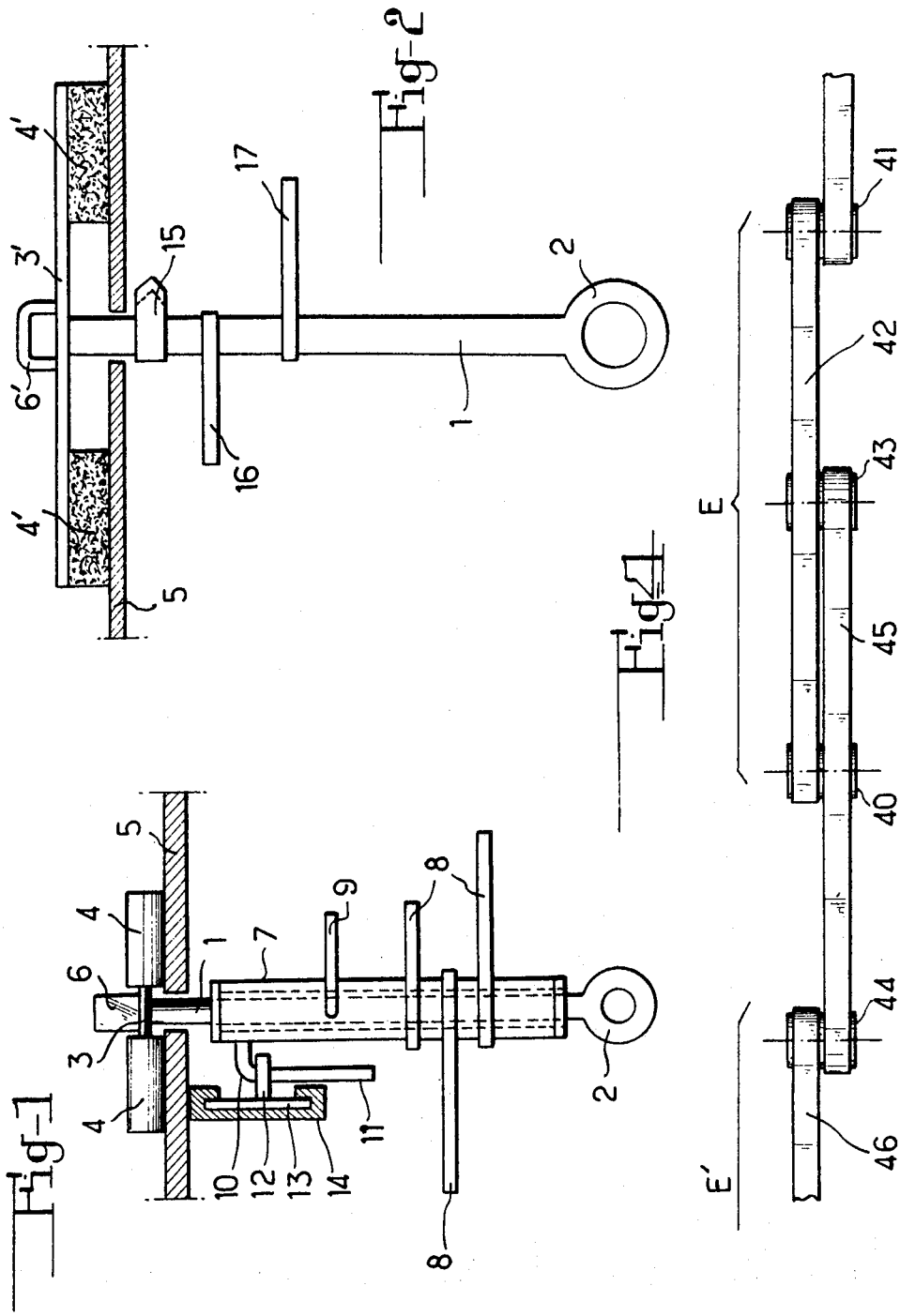

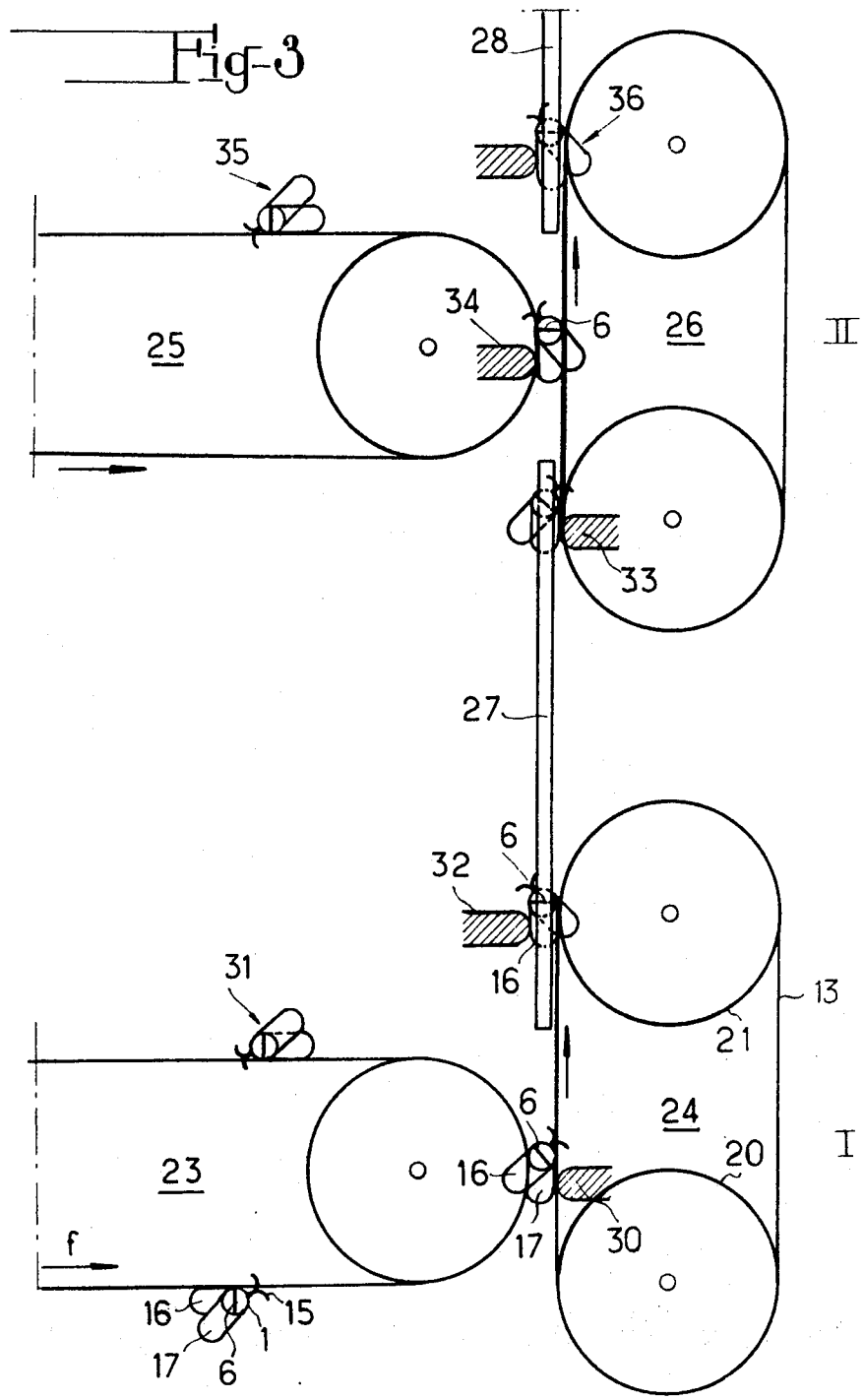

CONVEYORS INTENDED TO CARRY DIRECTLY OBJECTS OR OBJECTS MOUNTED ON SUPPORTS

The present invention concerns conveyors intended to carry directly objects or objects mounted on supports and more particularly conveyors capable of grasping and releasing either the objects carried or their support, in any place chosen and without human intervention.

Conveyors are very generally used in all branches of industry whenever it is a matter of transporting objects from one point to another. Now, it may happen that the objects to be transported have to travel over a course in several stages, defined by a series of conveyors arranged one after another, but not connected by any material coupling. In such a transport chain, the transfer of objects from one conveyor to the next has been carried out by hand up to now, which can be expressed as a loss of time and as an additional expense by the permanent employment of a workman. Then again, the handling of objects during their transfer may be harmful to them, for example in the case of fragile objects or in the case where conditions of absolute cleanliness must be respected. Moreover, such conveyors generally involve very costly mechanical complications, notably in the changes of direction and incline. The aim of the present invention is to remedy these disadvantages by putting into effect a conveyor of extremely simple design, of versatile and varied use, at a relatively low cost price and working without human intervention.

Briefly, the conveyor according to the invention is made up of a succession of standard rectilinear transport elements, driven by reduction drive motors, each one comprising at least two pulleys around which winds a driving element, such as a chain or a belt provided with gripping members designed to grip the objects to be transported or their support, guide rails for the driving element, at least one bearing surface intended to bear the weight of the object and its support and transfer means able to separate the object or their support from a standard rectilinear element and to engage them with the next standard rectilinear element of the conveyor.

The transfer means may be made up of stops controlling a rotation of the object and its support, enough to free it from the gripping members of a standard element and to fasten it to the gripping members of the next standard element.

According to one particular method of putting into effect the invention, each of the standard rectilinear elements of the conveyor comprises two double grooved end pulleys, a driving element such as a belt or a chain provided with gripping members and passing over one of the grooves of the said pulleys, a relay pulley positioned between the two end pulleys and a relay belt also fitted with gripping members and passing, on the one hand, around the relay pulley and, on the other, over the free groove of the end pulley of the next standard rectilinear element of the conveyor.

So, the object carried along by a standard rectilinear element is taken over, from the relay pulley, both by the belt of the first standard rectilinear element and by the relay pulley, then by the relay pulley alone and finally by the belt of the second standard rectilinear element.

When the transport is carried out on the same plane, the standard rectilinear elements are generally used flat, the objects or their support being carried along laterally. Such a conveyor allows every change of direction to be carried out in the same plane, between two standard rectilinear elements forming between them any angle whatever.

The changes of plane will be effected by means of an inclined standard rectilinear element, placed in a vertical plane. According to the invention the support comprises a vertical stem whose lower end is furnished with a portion of appropriate shape for hosking the object, for example a ring, a hook or a curve and whose upper part is furnished with a suspension element intended to move on the bearing surface of the standard rectilinear element, the said vertical stem being fitted with means of attaching the support to the lateral standard rectilinear elements, means designed to cooperate with the gripping members of the vertical standard rectilinear elements, at the time of a charge of plane, and members to orientate the support around the geometrical axis of the vertical stem and means of re-engaging the support.

The invention will now be described with reference to the accompanying drawings in which:

FIG. 1 is an elevation of an object support, shown in engagement with the driving belt of a standard rectilinear element of transport according to the invention.

FIG. 2 is an elevation of a second method of realizing the object support.

FIG. 3 is a plan view of a switching point of object supports designed to direct the supports towards one of several standard rectilinear transport elements according to a first method of realization and FIG. 4 is partial view of an elevation of a relay conveyor according to a second method of realization.

With reference to FIG. 1, the object support according to the invention is made up of a vertical stem 1 furnished at its lower end with an object-carrier ring 2 or with any other similar gripping member, such as a hook, a curve, a magnet, or boat-shaped carrier, etc. The upper end of the stem 1 is solid with a suspension rod bearing rollers 4 at its extremities intended to roll on a flat surface 5. Depending on the nature and weight of the object the rollers may be replaced by felt cushions, by pivoting castors or by balls. The suspension rod 3 bears a small plate 6 appreciably vertical whose function will be explained later on.

A tube 7 is fitted over the stem 1 and fixed in position by any known means. The tube 7 bears a plurality of radial blades 8 positioned at different levels, a horizontal disconnecting rod 9 and a hook 10 bent downwards comprising a vertical portion 11 which goes down lower than the disconnecting rod 9.

This object-carrier support can be carried along by a relay conveyor formed of several standard rectilinear elements, each one of which, it is pointed out for the moment, comprise an element of transmission of the object or its support, formed for example by a belt or chain. 13 fitted with a gripping member 12, such as spikes, magnets, etc., and moving inside a guide rail 14.

Of course, it is possible to provide a second hook similar to the hook 10, each of them being intended to fasten selectively to the gripping members of two standard rectilinear elements in a change of direction, as will be explained presently.

The rod 9 has a disconnecting function. Indeed, when in a train of supports moving on a standard rectilinear element, the first support is disconnected and comes to a stop, the hook 11 of the next support slides along the disconnecting rod 9 of the support at rest. During this sliding the second support undergoes a rotation about the geometric axis of its vertical stem 1, in a direction such that the hook 11 is disconnected from the gripping member 12. In the same way the disconnection of the following supports is effected step by step.

The support illustrated in FIG. 2 is distinguishable from the preceding one in that the various orientation and disconnecting members are fixed directly on the vertical stem 1 and in that the suspension rod is replaced by a plate 3' provided with felt cushions 4' and having a ring 6' on its upper surface. Then again, the disconnecting hooks 10 are replaced by a single double hooked element 15. The function of the disconnecting rod of the previous example may be assumed by the slider 3'–4'<~ itoclf By way of example, FIG. 3 illustrates an application of the conveyor according to the invention applied at the switching point of the supports. In this figure, each support is represented in plan view by its vertical stem 1, by the double hook 15, by the direction changing blades 16, 17 and by the plate 6 of the upper anchorage. Because of their appearance, the supports will be referred to, in what fellows, in a picturesque way as "bees."

The standard rectilinear elements are each made up of two pulleys 20, 21 connected by a belt or chain 13 provided with gripping means as specified above. The standard rectilinear elements are driven by reduction drive motors, in a manner known in itself. the clearness of the drawing neither the guide rails of belt 13 nor the reduction drive motors have been illustrated. The standard rectilinear elements 23 and 24 are placed flat in a horizontal plane, for example the first floor I of a warehouse in which it is proposed to switch objects having the same characteristics towards the same stockpile. The standard elements 25 and 26 are placed in the second floor of the warehouse. The two stages are connected by an inclined standard rectilinear element placed vertically. In the same way, the standard rectilinear element 28 connects the second floor with the third floor.

At each intersection of standard elements and at each change of incline disconnecting stops are provided, placed at different levels, corresponding to those of the direction blades. the stops act on the blade situated at the same level so as to disconnect the corresponding support from the first standard element in order to connect it to the next element.

The working of the device in FIG. 3 is as follows:

The bees are driven along in the direction of the arrow by the chain on the belt of the rectilinear element 23. Each of the bees is engaged with a gripping element of the chain or belt because of its left-hand hook. The fixed selective stop 30 only acts on the bees intended for following stages, other than the first stage. The stop 30 acts on the blade 17 of each of the bees, thus disconnecting the left-hand hook from the band of element 23 and immediately connecting the right-hand hook in the spikes of the card band of the standard element 24. The bees such as 31 whose blade 17 is not at the same level as the stop 30 continue to move on the element 23.

The bees carried along by element 24 are all disconnected and connected to the standard vertical lifting element by means of a fixed stop 32 acting on the blade 16. The gripping members of element 27 push plate 6 of the supports. The bees arriving at stage II are all disconnected by a stop 33 which fixes them on standard element 26. Stop 34 selects the bees 35 intended for the standard element 25 and lets bees 36 pass to the following stages.

Besides the fixed stops, such as 32 and 33 which act on all the supports and the selective fixed stops, such as 30 and 34 which only act on a sequence of determined supports, the circuit of conveyors may be provided with controlled stops to cause the disconnection and connection of a series of supports, the control being carried out either by an operator, or by a support, or by a computer, ranges of stops allowing the selection of different objects and forming a veritable filter, quantitative stops allowing the passage of a determined number of supports and then closing again. On the other part, a reconnecting member may be associated with the standard elements, for example a spring allowing eventually the regular spacing of the objects. In some cases, it is advantageous to replace the standard elements by simple sloping ramps on which the bees slide as far as their destination. At the entry of each ramp a device will be provided allowing the support to be placed on the ramp.

FIG. 4 shows a second method of putting into effect the conveyor according to the invention. This conveyor is made up of rectilinear elements E, E', etc. positioned lengthwise, for example one after the other. Each standard element comprises two double-grooved and pulleys 40, 41 connected together by a belt or a chain provided with gripping members. This belt 42 passes inside one of the grooves of the pulleys 40, 41, for example the upper groove. The standard rectilinear element also comprises a double grooved relay pulley 43 placed between the two pulleys 40, 41 and connected to an end pulley 44 of the next standard rectilinear element E' by a relay belt 45 passing in the lower grooves of pulleys 43 and 44. So, the object and its support is successively taken over by belt 42 alone between pulleys 41 and 43, then by the belts 42 and 45 between pulleys 43 and 40, then by the relay belt 45 alone between pulleys 40 and 44 and finally by belt 46 of the standard element E'.

Among the numerous applications of the conveyor according to the invention the following are quoted by way of example: the direct transport of objects by a single standard element or simultaneously by two or more standard elements, means of pushing being provided in the case where the objects are of unequal thicknesses and the transport of the objects mounted on supports for all industrial or commercial uses, such as production lines programmed or not, storage warehouses with maximum use of volume, self-services, super markets, automatic sorting and storage of all objects, selection and return of all objects, control being carried out by an operator or by a computer, etc.

It will be noted that because of the spacing out of the standard rectilinear elements and the picturesque representation of the bees it is possible to find the best solution for each particular case.

What I claim is :

1. Conveyor and transfer system comprising a plurality of supports adapted to mount articles for conveyance therealong, each said support comprising a vertically depending rod having at its lower end a portion for suspending an article, a suspension portion fastened to said rod at its upper end, hook means fastened to said rod intermediate said ends, radially extending elements connected to said rod along the length thereof, a plurality of contiguously positioned identically-shaped conveyor elements disposed in a common horizontal plane, each said conveyor element including at least two end pulleys, stationary frame means rotatably mounting said end pulleys, endless motion transmitting means inter-connecting said pulleys, gripping means attached to said motion transmitting means adapted to engage said hook means for driving the latter, guide rails for said motion transmitting means, track means disposed on said guide rails and adapted to be engaged by said suspension portion for supporting said supports, stationary orientation elements mounted on said frame means and disposed between each of two of said contiguous conveyor elements, said orientation elements being adapted to cooperatively engage said radially extending elements during movement of the supports on at least one of said two contiguous conveyor elements to thereby rotate said support about its vertical axis to an extent disengaging said hook means from the gripping means on said motion transmitting means and to engage the hook means with the gripping means of a motion transmitting means of the successive conveyor element.

2. Conveyor and transfer system as claimed in claim 1, wherein said orientation elements comprise stops disposed along the path of the gripping means on the first of said two contiguous conveyor elements, and substantially upstream of the transfer point between said successive conveyor elements.

3. Conveyor and transfer system as claimed in claim 1, each said end pulley comprising a double-grooved pulley, a relay pulley disposed intermediate said end pulleys, a relay motion transmitting means inter-connecting and extending about said relay pulley and an end pulley of a successive conveyor element, and gripping means being provided on said relay motion transmitting means.

4. Conveyor and transfer system as claimed in claim 1, comprising an inclined conveyor element for effecting changes in the plane of article conveyance, an upper end pulley for said inclined conveyor element being disposed adjacent an end pulley of a conveyor element in an upper plane of article conveyance, and a lower end pulley for said inclined conveyor element being disposed adjacent an end pulley of a conveyor element in a lower plane of article conveyance.

5. Conveyor and transfer system as claimed in claim 4, including gripping means on a motion transmitting means for said inclined conveyor element, said suspension portion of said support including a ring portion adapted to engage said last-mentioned gripping means for effecting the change of plane in the article conveyance.

6. Conveyor and transfer system as claimed in claim 1, said suspension portion comprising a horizontal plate, and felt cushions mounted on said plate for sliding movement on said track means.

7. Conveyor and transfer system as claimed in claim 1, said suspension portion comprising a horizontally extending axle, and rollers rotatably mounted on said axle adapted to move along said track means.

8. Conveyor and transfer system as claimed in claim 1, said radially extending elements on said rod comprising blades extending transversely with respect to the direction of article conveyance.

9. Conveyor and transfer system as claimed in claim 1, each of said radially extending elements being of identical lengths, said elements being fastened to said rod at spaced elevations, said orientation elements being located at corresponding elevations, so as to effect transfer of selective ones of said supports having radially extending elements at said corresponding elevations.

* * * * *